Nov. 3, 1959     L. D. KLEISS     2,911,361
APPARATUS AND PROCESS FOR SOLVENT EXTRACTION
Filed Feb. 25, 1955
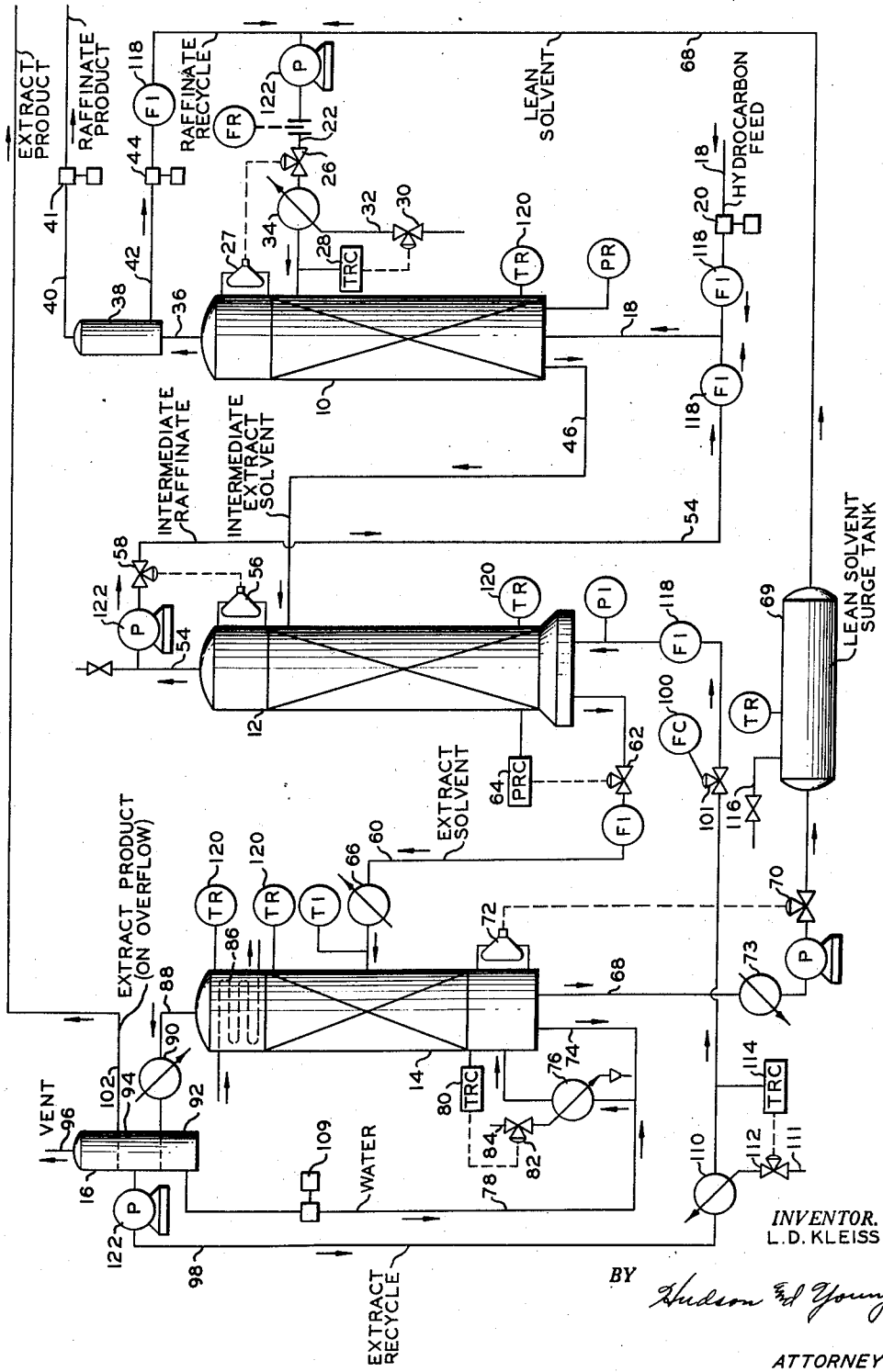
INVENTOR.
L. D. KLEISS
BY
ATTORNEYS

United States Patent Office 2,911,361
Patented Nov. 3, 1959

---

2,911,361

APPARATUS AND PROCESS FOR SOLVENT EXTRACTION

Louis D. Kleiss, Phillips, Tex., assignor to Phillips Petroleum Company, a corporation of Delaware Application February 25, 1955, Serial No. 490,525

14 Claims. (Cl. 208—311)

This invention relates to a process and arrangement of apparatus for effecting solvent extraction of liquid mixtures and separation of the same into their components. A specific aspect of the invention pertains to a method and apparatus for controlling a solvent extraction process.

The separation of liquid mixtures of organic materials and particularly hydrocarbon compounds into two or more fractions of different characteristics by solvent extraction and recovery of the separated compounds from the solvent has long been practiced. As applied to hydrocarbons the selective solvent utilized usually has a greater affinity for more cyclic and/or unsaturated hydrocarbons in a series of hydrocarbons of similar molecular weight. In conventional solvent extraction processes one of the chief problems is control of the process so as to effect a uniform separation or the production of a product stream of uniform purity or high concentration of the desired component or components of the extract and/or raffinate streams. Due to process variables difficult to control, including feed composition, temperature in the various contacting zones, flow rate of streams, pressure conditions within the system, etc., constant results with smooth operation are difficult to obtain. Pressure surges within the equipment are frequent and of considerable magnitude, thereby throwing the process out of control and requiring considerable time to bring the process back on smooth operation and the product stream or streams up to the desired standard of purity or component concentration.

One of the principal objects of the invention is to provide a process and arrangement of apparatus for the efficient separation of the components of a liquid mixture, utilizing a selective solvent for one or more of the components. Another object is to provide a process and apparatus for effecting liquid-liquid extraction of a liquid mixture with accurate and close control of the flow of streams to and from the extraction column. It is also an object of the invention to provide a process and arrangement of apparatus for effecting liquid-liquid extraction which prevents surging and pressure pulsations within the extraction equipment. A further object of the invention is to provide a process and arrangement of apparatus for separating a hydrocarbon mixture into selected hydrocarbon fractions by liquid-liquid extraction with a selective solvent whereby accurate and close control of the character of the selected hydrocarbon fraction is afforded. Other objects of the invention will become apparent from a consideration of the accompanying disclosure.

The invention is applicable to the conventional solvent extraction processes of the prior art and comprises an arrangement of apparatus with controls and a method of operation for controlling a solvent extraction process so as to maintain substantially uniform and smooth process conditions throughout the extraction and separation system.

In accordance with the invention, the various streams flowing to and from a liquid-liquid extraction process, with the exception of the solvent feed stream and the extract product stream, are maintained on substantially constant flow. The rate of flow of solvent feed to the extraction column is varied to supply the required amount of solvent to extract the desired amount of extract material under unavoidably fluctuating process conditions including temperature, pressure, feed composition, etc. The essential feature of the invention comprises varying the solvent feed rate under reasonably uniform process conditions to maintain a substantially constant solvent-raffinate interface level in the column. If the feed to be extracted is fed at a constant rate to a steady state column and a smaller stream of raffinate is removed from the top of the column, the balance of the feed stream must be removed by solution in the solvent. The amount of solvent (flow rate) needed varies with fluctuations in temperature, pressure, liquid compositions, and reflux rate. The correct solvent rate causes the raffinate-solvent interface level to stabilize and, hence, this interface may be sensed by a liquid-level-controller and utilized to control the solvent feed rate.

In a preferred embodiment of the invention the rate of flow of feed, raffinate product, raffinate recycle, and extract recycle or reflux are maintained constant by any suitable means, such as a metering pump or constant flow control valve; the extract phase (solvent plus extracted material) is maintained on pressure control; and the extract product is maintained on liquid level control of the solvent fractionator overhead product accumulator. The solvent stream is preferably saturated with raffinate components prior to entry into the extractive column by admixture with the raffinate recycle stream. In this method of operation, it is desirable to maintain the temperature of the inlet streams relatively constant.

In one embodiment of the invention, the extraction column is divided into two or more sections which are operated as separate extraction zones arranged in series, the intermediate extract phase taken from the bottom of the first column or section to which the feed is introduced being passed to the upper portion of the second section, and the intermediate raffinate taken from the top of the second section being introduced to the lower portion of the first section, and so on with any number of sections. These separate sections may be considered as extraction columns operated in series.

The process of the invention comprises passing a feed stream including a plurality of liquid components into an intermediate section of an extraction zone; passing a solvent stream comprising a selective solvent for at least one of the components of the feed into an upper section of the extraction zone so as to effect commingling of the feed and solvent and extraction of at least one of the feed components to form a solvent-extract phase and a raffinate phase lean in the extract and establish an interface in the extraction zone between the phases; recovering a raffinate stream from the uppermost section of the extraction zone; recovering a solvent-extract stream from the lowermost section of the extraction zone; separating the solvent-extract stream into a solvent stream and a concentrated extract stream; separating the concentrated extract stream into an extract product stream and an extract recycle stream; recovering the extract product stream and recycling the extract recycle stream to the extraction zone as reflux; and controlling the operation of the extraction zone by the steps comprising maintaining a substantially constant flow of feed, raffinate, and extract recycle, and varying the flow rate of the solvent stream so as to maintain a substantially constant interface between the solvent and raffinate in the extraction zone.

Illustrative of the processes to which the invention is applicable are the separation of cycloparaffins such as cyclohexane from a mixture of the same with paraffins; separation of aromatics from a mixture with paraffins; separation of aromatics from a mixture with naphthenes and paraffins; and separation of aromatics and naphthenes from a mixture with paraffins. Commonly used selective solvents include methyl Carbitol, furfural, methanol, diethyleneglycol, triethyleneglycol, acetonitrile, sulfur dioxide, and their aqueous solutions. Alcohol and other solubility modifying agents may be used.

A more complete understanding of the invention may be had from a consideration of the accompanying drawing which is a flow diagram illustrating one embodiment of the invention.

Referring to the drawing, the apparatus includes an upper extraction column 10 and a lower extraction column 12 together with a steam distillation or fractionation column 14 and a phase separator 16 connected by lines hereinafter described. A feed line 18 including a flow control device 20, such as a metering pump, connects with the lower section of column 10 for introduction of feed thereto at a constant rate. A solvent feed line 22 having positioned therein a flow control valve 26 connects with an intermediate section of column 10 for introduction of solvent thereto at a controlled rate. A liquid-level-controller 27 sensitive to the raffinate-solvent interface level in column 10 regulates valve 26 so as to maintain a constant interface level. A temperature-recorder-controller 28 connected with line 22 near column 10 operates a flow control valve 30 in a steam line 32 which passes steam thru a heater 34 in line 22. This arrangement permits heating the solvent stream to the proper temperature for introduction to column 10.

A raffinate effluent line 36 enters a surge tank 38 from which a raffinate product line 40, containing metering or flow control device 41, passes to suitable disposal. A raffinate recycle line 42 having positioned therein a flow control device 44 connects with solvent feed line 22 upstream of flow control valve 26. A solvent-extract effluent line 46 connects the bottom of column 10 with an intermediate section of column 12 for delivery of intermediate solvent-extract thereto. An intermediate raffinate effluent line 54 connects the top of column 12 with feed line 18. Line 54 may also connect directly with the lower section of column 10. A liquid or interface-level-controller 56 sensitive to the interface level in the upper section of column 12 is operatively connected to a flow control valve 58 in line 54 so as to maintain a substantially constant interface level in column 12 by regulating the flow of intermediate raffinate to column 10.

A line 60 connects the bottom of column 12 with an intermediate section of a steam distillation column 14 thereby providing flow of solvent-extract from extraction column 12 to separation column 14. A flow control valve 62 positioned in line 60 is operatively connected with a pressure-recorder-controller 64 which is sensitive to pressure in column 12 and operates valve 62 so as to maintain a selected predetermined pressure in column 12. A heater 66 positioned in line 60 near column 14 provides for heating the solvent-extract stream to the proper temperature for introduction at a corresponding temperature point in column 14. A solvent recycle line 68 connects the bottom of column 14 with lean solvent surge tank 69 which is also connected with solvent feed line 22. Flow of solvent in line 68 is regulated by flow control valve 70 operatively connected with liquid-level controller 72 which is responsive to the liquid level in the lower section of column 14 and regulates the flow of lean solvent in line 68 so as to maintain a substantially constant liquid level. Temperature control of the lean solvent in line 68 is provided by cooler 73, as desired.

Heat for operation of steam distillation column 14 is provided by recycle line 74 which passes thru heater 76 and returns to column 14. Water for the steam distillation is supplied by line 78 which connects with line 74 upstream of heater 76. A temperature-recorder-controller 80 sensitive to temperature in column 14 is operatively connected to a flow control valve 82 in a steam line 84 which passes steam thru heater 76 in indirect heat exchange with the liquid passing thru line 74, including water from line 78. The lean solvent stream 68 leaving column 14 is saturated with water at the temperature and pressure existing within the lower section of the column, and the water content of the solvent is controlled by adjustment of temperature-recorder-controller 80. An alcohol or other liquid may be used instead of water as a stripping agent and to modify the solvent power of the solvent.

A cooling coil 86 positioned in the upper section of column 14 provides internal reflux for this column. An effluent line 88 connects with the top of column 14 and with an intermediate section of phase separator 16 for passage of distilled vapor into condenser 90 and thence into separator 16 where the extract containing entrained water is separated into a water phase 92 and an extract phase 94. A vent line 96 connects with the top of separator 16 for the withdrawal of uncondensed vapor from the system.

Extract is recycled via line 98 at a steady predetermined rate under the control of flow controller 100 and valve 101 to the lower section of column 12 as reflux. The remaining portion of the rich extract is withdrawn thru line 102 on overflow from accumulator or separator 16. Water is withdrawn from the water phase 92 in separator 16 thru line 78 at a constant rate by means of flow control device or metering pump 109 positioned in line 78, and the flow rate is periodically regulated by resetting pump 109 so as to maintain a suitable interface (or water) level in separator 16. However, an interface-level-controller on separator 16 may be utilized to control the flow of water in line 78 to automatically maintain the desired water level in the separator.

Control of the temperature of the extract recycle stream is provided by a heater 110 positioned in line 98. A heating fluid, such as steam, is passed thru the heater via line 111 under the control of valve 112 which is operated by temperature-recorder-controller 114 which in turn is sensitive to the temperature in line 98 and regulates the heating in heater 110 so as to provide a suitable predetermined temperature in the extract recycle stream.

Line 116 connects with lean solvent surge tank 69 so as to provide for replenishing the supply of solvent for the process. A number of flow indicating elements 118 are provided in some of the lines for measuring the flow in these lines at any particular time. Several temperature recorders 120 are connected at various points in the system for determining temperature. Several pumps 122 are shown positioned in the various lines to effect the desired flow and pressure in those lines. Other pumps and indicating devices may of course be utilized where needed. Steam distillation column 14 may be replaced by another type of distillation means, and the solvent power of the solvent may be adjusted by contacting with water or other agent under controlled conditions, or by ratio flow control of solvent and modifying agent.

The invention is not limited to any specific instruments but is broad enough to encompass any instruments which have the designated function or functions. The invention is rather in an arrangement of apparatus elements which effect the process control disclosed and in the process control steps practiced as disclosed.

The following examples are set forth to illustrate the invention and its applicability to different systems. The data given represent spot determinations under steady state conditions. The proportion of recycle extract to product was varied as conditions required in order to maintain substantially constant extract product composition. The data and examples are illustrative and should not be interpreted as unnecessarily limiting the invention.

EXAMPLE I

The apparatus shown in the drawing was utilized in separating a normal octane concentrate from a mixed hydrocarbon feed containing principally $C_8$ to $C_{10}$ paraffins, aromatics, and naphthenes, as shown in Table 1 below, utilizing wet methyl Carbitol as a solvent. The extraction columns were 4" in diameter and 30' long and were packed in conventional manner with 25.5' of ½" Berl saddles. Approximately 1155 pounds of 70+ liquid volume percent $C_8$ paraffins (85–89 liquid volume percent $C_8$–$C_{10}$ paraffins) was made from 2042 pounds of feed in a two-pass extraction with wet methyl Carbitol. In the extraction, approximately 90% of the $C_8$ naphthenes and essentially all of the aromatics contained in the feed were removed in the extract product. More complete data for the run are shown in Table 1 below.

The extract from the first pass (shown in Table 1) was introduced to column 12 at an intermediate point therein at the rate of 1.30 g.p.h. under the control of metering pump 20. Methyl Carbitol containing 2.2 liquid volume percent water was introduced by line 22 into column 10 at an average rate of 46 g.p.h. and this stream also included 5.0 g.p.h. of recycle raffinate meter by pump 44. This flow rate of solvent in line 22 was regulated by level controller 27 controlling valve 26 so as to maintain a constant interface level in column 10. Raffinate product containing about 86 LV percent paraffin was withdrawn at the rate of 0.5 g.p.h. by metering pump 41. Extract recycle and product contained 7 LV percent paraffin. The extract recycle in line 98 was maintained at 12.6 g.p.h. by flow-controller 100 and the rate of recovery of extract product in line 102 (on overflow) averaged about 0.8 g.p.h. The solvent feed temperature was maintained at approximately 124° F. and the reflux at 110° F. The temperature in column 10 varied from about 116° F. at the bottom to 118° F. at the top and the bottom temperature in column 12 was about 108° F.

Pressure-recorder-controller 64 was set to maintain a pressure of 18 p.s.i.g. in column 12 and this pressure was substantially maintained during the run.

Table 2

| Run No. | Hydrocarbon Feed | | Raffinate Product | | Reflux Ratio | Recovery of n-Nonane in Raffinate, percent |
|---|---|---|---|---|---|---|
| | g.p.h. | Wt. percent n-Nonane | g.p.h. | Mol percent n-Nonane by F.P. | | |
| 1 | 1.00 | 73 | 0.413 | 96 | 7.7 | 53.4 |
| 2 | 1.00 | 73 | 0.555 | 96.80 | 11.2 | 71.8 |
| 3 | 1.00 | 73 | 0.635 | 96.84 | 14.0 | 82.3 |

EXAMPLE III

Runs were made utilizing the control and separation system substantially as shown in the drawing in the separation of naphthenes (mainly dimethylcyclopentanes) from paraffins (mainly 2 and 3 methylhexenes). In a typical run the feed contained 49.7 LV percent naphthenes and was introduced at an intermediate point to column 12 at the rate of 1.48 g.p.h. Methyl Carbitol solvent containing 3 to 5 liquid volume percent water was fed at an average rate of 62.8 g.p.h. together with a constant raffinate recycle of 5.0 g.p.h. into the upper section of column 10. The interface level in column 10 was maintained substantially constant by level controller 27 which passed the required amount of solvent and raffinate recycle thru valve 26 to effect this control. Raffinate product containing 0.7 LV percent naphthenes was recovered at the rate of 0.57 g.p.h. under the control of metering pump 41. Extract product containing 71.7 LV percent naphthenes was recovered at the average rate of 0.91 g.p.h. on overflow from accumulator 16. The rate of extract recycle in line 98 was maintained constant at 8.16 g.p.h. by flow-controller 100. The flow ratio was 8.80 and the reflux ratio was 8.97.

The pressure in the bottom of column 12, as indicated by instrument 64, was 18.2 p.s.i.g. The temperature in the bottom of column 12 was 121° F. and the temperature in the top of column 10 was 134° F. The temperature of the stream in line 22 between heater 34 and column 10 was maintained at 138° F. The temperature of the stream in line 60 was maintained at 120° F. by heater

Table 1

| Material | Sp. Gr. 20/4 | Liquid Volume, Percent [1] | | | | | | | | | |
|---|---|---|---|---|---|---|---|---|---|---|---|
| | | Paraffins | | | Aromatics | | | | Naphthenes | | |
| | | $C_8$ | $C_9$ | $C_{10}$ | $C_7$ | $C_8$ | $C_9$ | $C_{10}$ | $C_8$ | $C_9$ | $C_{10}$ |
| Feed | 0.7449 | 45.1 | 14.8 | 0.9 | 0.5 | 11.4 | 1.5 | 0.1 | 18.7 | 6.4 | 0.6 |
| 1st Pass Raffinate | 0.7156 | 72.0 | 16.3 | 1.1 | 0.0 | 1.6 | 0.5 | 0.2 | 2.8 | 4.6 | 0.9 |
| 1st Pass Extract | 0.7711 | 34.6 | 6.7 | 0.6 | 0.7 | 19.1 | 2.1 | 0.1 | 28.9 | 6.9 | 0.3 |
| 2nd Pass Raffinate | 0.7167 | 69.1 | 15.6 | 0.9 | 0.0 | 1.0 | 0.5 | 0.2 | 2.6 | 9.3 | 0.8 |
| 2nd Pass Extract | 0.8052 | | [2] 6.4 | | | | [3] 36.7 | | | [4] 56.9 | |

[1] Calculated from mass spectro analysis.
[2] Total paraffins by PONA analysis.
[3] Total aromatics by PONA analysis.
[4] Total naphthenes by PONA analysis.

EXAMPLE II

Several runs were made in a liquid-liquid extraction system arranged substantially as shown in the drawing utilizing a feed containing 73% normal nonane and a methyl Carbitol solvent containing from 3 to 5 weight percent water. Approximately 337 pounds of 96+ mol percent n-nonane was made from 681 pounds of 73% n-nonane in the runs. The overall recovery of n-nonane contained in the feed as raffinate product was approximately 65 percent, the highest recovery in a single run being 82.3%.

The method of operation was similar to that described in Example I. Data obtained in three representative runs are shown in Table 2.

66 and the temperature of the extract recycle entering column 12 via line 98 was maintained at 110° F. by heater 110.

In the various runs made in the examples with the system and arrangement of controls shown and described, exceptionally smooth operation was encountered.

Certain modifications of the invention will become apparent to those skilled in the art and the illustrative details disclosed are not to be construed as imposing unnecessary limitations on the invention.

I claim:

1. In solvent extraction apparatus comprising an extraction column; a feed line leading into an intermediate section of said column having flow control means; a valved solvent feed line leading into an upper section of said column; a raffinate takeoff line connected with the top of said column having flow control means; and a solvent-extract takeoff line connected with a lower section of said column, the improvement comprising means for controlling the rate of raffinate takeof at a substantially constant value and means for varying the solvent input rate in response to the rise and fall of an interface between solvent and raffinate phases so as to stabilize said interface.

2. Apparatus for effecting liquid-liquid extraction of a mixed feed stream, comprising a liquid-liquid extraction column; a feed line leading into an intermediate section of said column having means for controlling the rate of flow therein; a solvent feed line leading into an upper section of said column having means for controlling the rate of flow therein; a raffinate line leading from the uppermost section of said column having flow control means therein; an interface-level-controller sensitive to an interface level in an upper section of said column at a level above said solvent feed line in operative control of the flow-control means in said solvent feed line; a solvent-extract line leading from the lowermost section of said column; means in said solvent-extract line for separating solvent-extract into a solvent stream in a solvent effluent line and an extract stream in an extract effluent line; an extract recycle line for passing extract effluent to a lower section of said column; and means for controlling the rate of flow in said extract recycle line.

3. The apparatus of claim 2 including a variable flow-control means in said solvent-extract line upstream of said means therein; a pressure-controller sensitive to pressure in said column and in operative control of last said means.

4. The apparatus of claim 3 wherein said means in said solvent-extract line comprises a steam stripping column having a line for introducing steam into a lower section thereof, an extract effluent line from an upper section thereof, and a solvent recycle line from the lowermost section thereof connecting with said solvent feed line; a flow control valve in said solvent recycle line; a liquid-level-controller sensitive to a liquid level in a lower section of said stripping column in operative control of last said valve; a phase separation vessel in said extract effluent line having an extract product line and an extract recycle line leading from an intermediate section thereof, said extract recycle line connecting with aforesaid extract recycle line; a condenser in said extract effluent line intermediate said stripping column and said vessel; and a flow control valve in said extract recycle line.

5. The apparatus of claim 4 wherein said extract product line connects with said phase separator at a level above said extract recycle line and is on overflow arrangement.

6. The apparatus of claim 5 wherein said extraction column comprises at least two separate vessels connected in series for flow of solvent-extract from the feed column toward the next downstream column in each instance and for flow of raffinate from each downstream column to the next upstream column.

7. The apparatus of claim 2 wherein said extraction column comprises at least two separate vessels connected in series for flow of solvent-extract from the feed column toward the next downstream column in each instance and for flow of raffinate from each downstream column to the next upstream column.

8. In a solvent extraction process comprising passing a liquid feed stream of a plurality of components into an intermediate section of an extraction column at a substantially constant rate; passing a stream of selective solvent for at least one of said components into an upper section of said column so as to effect commingling of said streams and extraction of at least one of said components to form a solvent-extract phase and a raffinate phase lean in said extract and establish an interface between the phases; withdrawing a raffinate stream from the top of said column; and withdrawing a solvent-extract stream from the bottom of said column; the improvement comprising withdrawing said raffinate stream at a substantially constant rate and varying the flow rate of said stream of solvent in response to the rise and fall of said interface so as to hold said rise and fall to a minimum.

9. A liquid-liquid extraction process comprising passing a feed stream comprising a plurality of liquid components into an intermediate section of an extraction zone; passing a solvent stream comprising a selective solvent for at least one of said components into an upper section of said extraction zone so as to effect commingling of said streams and extraction of at least one of said components to form a solvent-extract phase and a raffinate phase lean in said extract and establish an interface in said zone between said phases; withdrawing a raffinate stream from the uppermost section of said zone; withdrawing a solvent-extract stream from the lowermost section of said zone; separating said solvent-extract stream into a solvent stream and a concentrated extract stream; separating said concentrated extract stream into an extract product stream and an extract recycle stream; recovering said extract product stream and recycling said extract recycle stream to a lower section of said zone as reflux; and controlling the operation of said process by the steps comprising maintaining the flow rates of said feed stream, said raffinate stream, and said extract recycle stream substantially constant, and varying the flow rate of said solvent stream so as to maintain a substantially constant solvent-raffinate interface in said zone.

10. The process of claim 9 including the step of controlling the flow rate of said solvent-extract stream so as to maintain a predetermined pressure in said zone.

11. The process of claim 10 including the steps of separating said solvent from said solvent-extract stream in a steam distillation zone wherein said solvent is recovered as bottoms; regulating the flow rate of solvent from said distillation zone so as to maintain a substantially constant solvent liquid level therein; and recycling said solvent to said extraction zone.

12. The process of claim 10 including recycling a portion of said raffinate stream at a substantially constant rate to said zone.

13. A liquid-liquid extraction process comprising passing a feed stream comprising a plurality of liquid components at a constant rate into one of a plurality of extraction zones connected in series; passing a liquid solvent stream comprising a selective solvent for at least one of said components into an upper section of the first of said zones; effecting commingling of said feed and said solvent in said zones so as to extract at least one of said components thereby forming a solvent-extract phase and a raffinate phase lean in said extract and establishing an interface between said phases in each of said zones; passing said raffinate phase toward the upper end of said first zone and said extract phase toward the lower end of the last of said zones; withdrawing a raffinate stream from the upper section of said first zone at a constant rate; withdrawing a solvent-extract stream from the lower section of said last zone at such a rate as to maintain a predetermined pressure in said zones; regulating the flow rate of said solvent stream so as to maintain a predetermined interface level in said first column; controlling the flow of raffinate between said zones so as to maintain a constant interface level in each of said zones except said first zone; passing said solvent-extract stream to a fractionation zone maintained under conditions which separate said solvent from said extract; recovering an extract stream from said fractionation zone; recycling a portion of said extract stream at a substantially constant flow rate to one of said zones as reflux; and recovering the remainder of said extract stream as product.

14. The process of claim 13 including operating said fractionation zone as a steam distillation zone so as to recover an aqueous extract stream overhead and a kettle fraction comprising solvent; withdrawing solvent from the lower section of said fractionation zone at such a rate as to maintain a desired liquid level in said fractionation zone; effecting separation of said aqueous extract stream into an aqueous phase and an extract phase in a phase-separation zone; withdrawing a portion of said extract phase as said product stream and the remaining portion as said extract-rich recycle stream.

References Cited in the file of this patent

UNITED STATES PATENTS

| Number | Name | Date |
|---|---|---|
| 1,601,320 | Peters | Sept. 28, 1926 |
| 1,982,513 | Grote et al. | Nov. 27, 1934 |
| 2,107,265 | Archibald | Feb. 8, 1938 |
| 2,210,541 | Tijmstra | Aug. 6, 1940 |
| 2,277,070 | Carney | Mar. 24, 1942 |
| 2,299,426 | Rosebaugh | Oct. 20, 1942 |
| 2,360,861 | Pierotti et al. | Oct. 24, 1944 |
| 2,396,303 | Cummings et al. | Mar. 12, 1946 |
| 2,415,921 | Wagner | Feb. 18, 1947 |
| 2,654,792 | Gilmore | Oct. 6, 1953 |
| 2,695,322 | Weedman | Nov. 23, 1954 |
| 2,728,803 | McCauley | Dec. 27, 1955 |
| 2,746,846 | Grunewald | May 22, 1956 |
| 2,803,685 | Poffenberger | Aug. 20, 1957 |
| 2,831,038 | Morrison et al. | Apr. 15, 1958 |
| 2,855,362 | Ratje et al. | Oct. 7, 1958 |